(12) United States Patent
Wilensky (10) Patent No.: US 8,103,094 B2
(45) Date of Patent: Jan. 24, 2012

(54) COLOR CORRECTION BASED ON SKIN COLOR

(75) Inventor: Gregg D. Wilensky, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 888 days.

(21) Appl. No.: 11/233,535

(22) Filed: Sep. 22, 2005

(65) Prior Publication Data
US 2007/0065006 A1 Mar. 22, 2007

(51) Int. Cl.
*G06K 9/00* (2006.01)
*G06K 9/40* (2006.01)

(52) U.S. Cl. ..... 382/167; 382/254; 382/274; 348/223.1; 348/225.1; 348/652; 348/655; 358/516; 358/518

(58) Field of Classification Search ............. 382/167, 382/274; 348/223.1, 225.1; 358/516, 518
See application file for complete search history.

(56) References Cited

U.S. PATENT DOCUMENTS

| | | | |
|---|---|---|---|
| 4,203,671 A * | 5/1980 | Takahashi et al. | 356/402 |
| 4,797,733 A * | 1/1989 | Takagi et al. | 348/225.1 |
| 5,333,070 A | 7/1994 | Ichikawa | |
| 6,249,317 B1 | 6/2001 | Hashimoto et al. | |
| 6,739,767 B2 * | 5/2004 | Ikeda et al. | 396/567 |
| 2003/0169348 A1 * | 9/2003 | Ikeda et al. | 348/223.1 |
| 2003/0235333 A1 | 12/2003 | Lin | |
| 2004/0196383 A1 * | 10/2004 | Suzuki et al. | 348/223.1 |
| 2004/0208363 A1 * | 10/2004 | Berge et al. | 382/167 |

FOREIGN PATENT DOCUMENTS
WO WO 2004/098202 11/2004

OTHER PUBLICATIONS

Website: http://www.cambridgeincolour.com/tutorials/white-balance.htm, "Tutorials: White Balance", published on Apr. 20, 2005, pp. 1-10.*
Tsumura, N., et al. "Image-based skin color and texture analysis/synthesis by extracting hemoglobin and melanin information in the skin". ACM Transactions on Graphics, SIGGRAPH 2003, vol. 22, No. 3, pp. 770-779.*
Karungaru, et al. "Skin Color Correction Through Scene Illuminant Estimation Using Neural Networks and Analytical Methods", University of Tokushima, 10 pages.

(Continued)

*Primary Examiner* — Vikkram Bali
*Assistant Examiner* — Julian Brooks
(74) *Attorney, Agent, or Firm* — Fish & Richardson P.C.

(57) ABSTRACT

Methods and apparatus, including computer program products, for performing color correction. One product can receive a digital image that includes a region depicting human skin; obtain a skin color value based on a sample; receive a skin parameter value that is a tan or a blush value; use the skin color value and the skin parameter value to determine an estimated ambient lighting condition of the image; and determine a color correction based on the estimated lighting condition and a target lighting condition. Another product can use the skin color value to determine an estimated color temperature of the image and an estimated tint shift of the image, and can determine a color correction based on the estimated lighting condition and a target lighting condition and the estimated tint shift. Another product can use the skin color value and the skin parameter value to determine an estimated camera color setting.

27 Claims, 2 Drawing Sheets

OTHER PUBLICATIONS

Storring, et al. "Estimation of the Illuminant Colour From Human Skin Colour", $4^{th}$ IEEE International Conference on Automatic Face and Gesture Recognition, Grenoble, France, Mar. 26-30, 2000 7 pages.

Storring, et al. "Skin Colour Detection Under Changing Lighting Conditions", $7^{th}$ Symposium on Intelligent Robotics Systems, Coimbra, Portugal, Jul. 20-23, 1999, 9 pages.

Wyszecki, et al. "Color Science: Concepts and Methods, Quantitative Data and Formulae, $2^{nd}$ Edition", John Wiley & Sons, 1982, pp. 224-229 and 502-503.

"Nikon D2H Skin Tone Problems?" [online] [dated May 28, 2004] http://web.archive.org/web/20040528232214/http:/www.lonestardigital.com/D2H_skin_tones.htm.

"Hue Selective Edit Tool: Using the Built-in Memory Colors" [online] [dated Apr. 23, 2003] http://web.archive.org/web/20030412113902/Http://www.picto.com/UserGuides/icorrectEditLab40/HueSelectToolC.html.

European Search Report for Application No. EP06254897.9, dated Mar. 23, 2010, 3 pages.

\* cited by examiner

COLOR CORRECTION BASED ON SKIN COLOR

BACKGROUND

The present specification relates to image processing and color correction.

It is conventional for an image processing application to provide tools with which a user can correct distortions of colors in a digital color image. A digital color image, by way of example, can be a scanned picture, a frame of a video clip, or a photo taken with a digital camera.

The colors in a digital image may be distorted for many reasons. There may be a color cast arising from surrounding elements in the scene, such as a green cast from surrounding vegetation. Any ambient lighting that differs significantly from normal daylight conditions can potentially impart an unwanted color change. An image taken at sunset or sunrise, for example, may impart an unwanted reddish-orange cast. Many cameras modify the image to compensate for such situations, either by letting the user manually specify a lighting condition or by attempting to correct this automatically by balancing color components across all or a portion of the image. Both methods can fail: the user may select the wrong setting; the image may have a predominant color component that defeats the automatic algorithm; or there may be more than one dominant light color in the scene.

There are conventional tools that adjust a color balance in a digital image to correct for color distortions.

One conventional tool allows user manipulation of one or more color curves of an image to adjust color balance. A red channel, a green channel, and a blue channel of the image, for example, can each have curves or values that a user adjusts to effect color correction. Such a conventional tool is typically used to adjust the entire image according to the new color balance based on the user's overall perception of the image.

Another conventional tool that can be used to correct color distortions allows a user to adjust color balance by changing an apparent illuminant color temperature in an image. In the example of a direct sunlight photo, the image can be adjusted to make the color temperature of the image cooler. As a result, however, pixels that should appear to be white may become bluish. In the example of an indoor photo, an adjustment to make the color temperature warmer may cause white pixels to appear red.

Many photographers have rules of thumb for how to go about adjusting skin color. Such rules require a subjective judgment and leave room for uncertainty. An example would be to use a curves tool in an image processing program such as the Adobe® Photoshop® program to modify each color component separately in order to obtain a specified ratio of red to blue and red to green components in the skin. An example description for CMYK images is: "Skin tones in a Caucasian person should consist of roughly equal parts of magenta and yellow, and a dash of cyan (equal to 15-25% the value of the magenta and yellow). Darker skinned people will have more cyan, and lighter skinned people will have less. Oriental people will have little cyan, and a smidgen more yellow than magenta."

SUMMARY

The invention provides methods and apparatus, including computer program products, for color correction based on image skin color in a digital image.

In one aspect, the invention is implemented to provide a computer program user interface tool that provides a user a quick and easy method for correcting colors in digital images. A user can select a sample of skin in an image and the tool proceeds to correct the image colors so that the skin color will be in the range of acceptable skin colors for a specified ambient lighting condition. Controls can be provided to modify the ambient lighting as well as to move within the acceptable range of varying skin tans and blushes which arise from varying amounts of melanin and hemoglobin in the skin. The tool optionally provides a further level of control to limit how much whites in the image change.

In general, in one aspect, the invention features methods and apparatus, including computer program products, for performing color correction on a digital image that includes a region depicting human skin. A computer program product in accordance with this aspect of the invention includes instructions that when executed cause a data processing apparatus to obtain a skin color value based on a sample of one or more pixels in the region; receive a skin parameter value, the skin parameter value being a tan parameter value or a blush parameter value; and use the skin color value and the skin parameter value to determine an estimated ambient lighting condition of the image.

Particular implementations of the invention include one or more of the following features. The instructions to determine an estimated ambient lighting condition include instructions to calculate an estimated ambient lighting color temperature. The computer program product is embedded in an image capture device, and the product includes instructions to detect a face in the image to identify the region depicting human skin. The product includes instructions to determine a color correction based on the estimated lighting condition and a target ambient lighting condition and to apply the color correction to the image. The product includes instructions to determine an estimated tint shift and to determine the color correction based on the estimated tint shift. The product includes instructions to provide a user interface operable to receive from a user an input specifying the skin parameter value and an input specifying the target ambient lighting condition. The target ambient lighting condition is a default daylight ambient lighting condition. The color correction is applied to only a portion of the image. The product includes instructions to enforce a white constraint on the color correction. The white constraint is enforced by blending a calculated corrected color with an original color for a pixel according to a blend parameter derived from a delta of the original color from a white color. The instructions to receive a skin parameter value include instructions to derive the skin parameter value from user input.

In general, in another aspect, the invention features methods and apparatus, including computer program products, for performing color correction on a digital image that includes a region depicting human skin. A computer program product in accordance with this aspect of the invention includes instructions that when executed cause a data processing apparatus to obtain a skin color value based on a sample of one or more pixels in the region; use the skin color value to determine an estimated ambient lighting color temperature of the image and an estimated tint shift of the image; determine a color correction based on the estimated lighting condition and a target ambient lighting condition and the estimated tint shift; and apply the color correction to the image.

Particular implementations of the invention include one or more of the following features. The product includes instructions to provide a user interface operable to receive from a user an input specifying the target ambient lighting condition. The target ambient lighting condition is a default daylight ambient lighting condition. The product includes instructions to enforce a white constraint on the color correction. The product includes instructions to receive a user input specifying a desired non-zero tint shift and to determine the color correction based further on the desired tint shift. The computer program product is embedded in an image capture device; and the product includes instructions to detect a face in the image to identify the region depicting human skin.

In general, in another aspect, the invention features methods and apparatus, including computer program products, for performing color correction on a digital image that includes a region depicting human skin. An apparatus in accordance with this aspect of the invention includes a means for obtaining a skin color value based on a sample of one or more pixels in a region of a digital image, the region depicting human skin; a means for receiving a skin parameter value, the skin parameter value being a tan parameter value or a blush parameter value; a means for using the skin color value and the skin parameter value to determine an estimated ambient lighting condition of the image; a means for determining a color correction based on the estimated lighting condition and a target ambient lighting condition; and a means for applying the color correction to the image.

Particular implementations of the invention include one or more of the following features. The apparatus includes an image capture device for capturing the image and a means for detecting a face in the image to identify the region depicting human skin. The apparatus includes a user interface operable to receive from a user an input specifying the skin parameter value and an input specifying the target ambient lighting condition. The apparatus includes a means for enforcing a white constraint on the color correction.

In general, in another aspect, the invention features methods and apparatus, including computer program products, for performing color correction on a digital image that includes a region depicting human skin. An apparatus in accordance with this aspect of the invention includes a means for obtaining a skin color value based on a sample of one or more pixels in a region of a digital image, the region depicting human skin; a means for using the skin color value to determine an estimated ambient lighting color temperature of the image and an estimated tint shift of the image; a means for determining a color correction based on the estimated lighting condition and a target ambient lighting condition and the estimated tint shift; and a means for applying the color correction to the image.

Particular implementations of the invention include one or more of the following features. The apparatus includes a user interface operable to receive from a user an input specifying the target ambient lighting condition. The apparatus includes a means for enforcing a white constraint on the color correction. The apparatus includes an image capture device for capturing the image and a means for detecting a face in the image to identify the region depicting human skin.

In general, in another aspect, the invention features methods and apparatus, including computer program products, for performing color correction on a digital image that includes a region depicting human skin. A computer program product in accordance with this aspect of the invention includes instructions that when executed cause a data processing apparatus to obtain a skin color value based on a sample of one or more pixels in the region; receive a skin parameter value, the skin parameter value being a tan parameter value or a blush parameter value; and use the skin color value and the skin parameter value to determine an estimated camera color setting. Particular implementations of the invention include one or more of the following features. The estimated camera color setting is used to determine a color correction of the digital image. The estimated camera color setting is a camera white point setting.

The invention can be implemented in embodiments that realize one or more of the following advantages. A user can effectively correct color distortions in an image by clicking once on a region of the image depicting human skin. In response, color distortions caused by, for example, poor ambient lighting, improperly applied optical filters, improperly applied digital filters, or improper white color balance are automatically corrected. The corrections are effective regardless of variations in the skin tones and other skin characteristics of the skin sample selected, for example, degree of darkness (e.g., tan) or degree of redness (e.g., blush). The skin colors in the image are valid, that is, do not deviate from the expected colors for a particular set of ambient lighting conditions.

Constraints can be placed on the color correction so that white pixels in an image, i.e., pixels in the image that should appear white, are preserved as white, or their coloration away from white is reduced. A user interface provides user control over the correction, including manual refinements of the correction and constraints. The correction can be applied across the entire image.

In addition, the invention can be implemented to produce accurate results with a digital image captured with a daylight camera white point setting. Accurate results can also be produced for other settings if the camera white point setting is known, as it is, for example, with a raw image format data file from a digital camera or other source which is accessible, for example, using the camera raw functionality of Adobe Photoshop. For situations in which this setting is unknown, the results are approximate but nevertheless qualitatively pleasing.

In addition, the invention can be implemented to provide control over the natural variations of skin colors through variation of an amount of modeled blush (hemoglobin concentration) and tan (melanin concentration). While providing this control over color variations, implementations of the invention can ensure that all the possible skin color variations that can be made remain valid skin colors. This is in contrast to conventional color correction tools that provide controls for color correction but do not ensure that all the possible control values will result in a valid skin color.

The details of one or more implementations of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
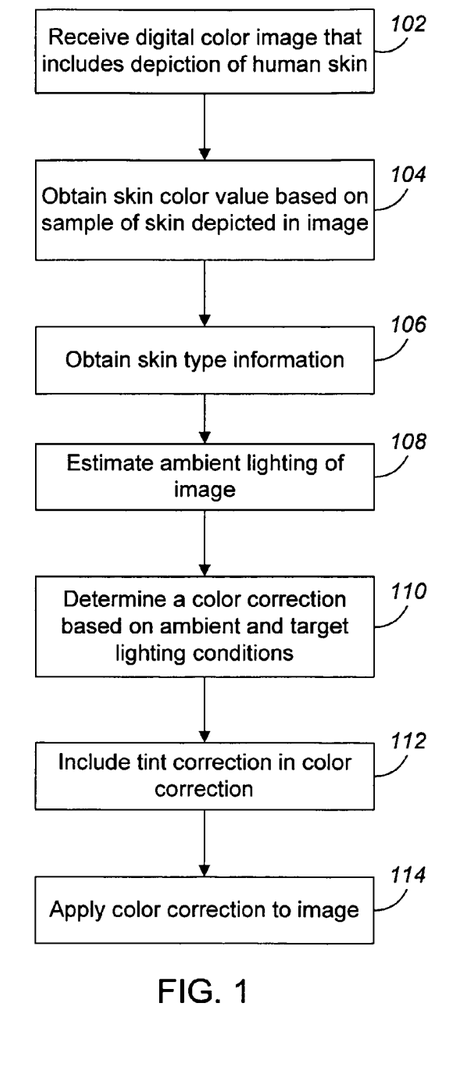
FIG. 1 is a flowchart of a method for image color correction based on skin color in accordance with one embodiment of the invention.

FIG. 1 shows a method for color correction based on skin color in a digital color image. A digital color image is received (step 102). The image includes one or more regions that depict human skin. Such an image can be captured using an image capture device, for example, a digital paper scanner, a digital film scanner, a digital camera, or a digital camcorder. The method can be implemented in an image processing application, e.g., a stand-alone computer program application of the kind used on a personal computer, or in an image capture device.

A sample of human skin colors depicted in the image is obtained (step 104). A region depicting human skin typically includes multiple pixels. The sample can be taken from multiple pixels of one or more regions that depict human skin. The sample can be taken from regions that depict human skin of one person or of different people. Alternatively, the sample can be taken from only one pixel. If multiple pixels are used, a mean, median, or other single skin color value derived from the samples is used for subsequent processing.

The sample can be obtained in response to a user input that selects one or more pixels in a display of the image. A computer mouse or another input device can be used to provide the user input. Alternatively, the sample can be obtained without requiring user input, for example, by applying face detection methods to identify regions in the image that depict human faces and therefore human skin.

Skin type information describing the skin type represented by the sample is optionally also obtained (step 106). In one implementation, illustrated in FIG. 3, a user interface window is displayed to enable a user provide input describing the skin type of the skin color sample. Controls allow a user to set a tan value and a blush value. These can represent varying levels of melanin and hemoglobin in human skin.

The method then uses the sample skin color value and, optionally, the skin type information, to estimate the ambient lighting of the image (step 108). In the implementation that will be described, the ambient lighting is represented by a color temperature, which is based on the common assumption that the lighting is sufficiently well approximated as a blackbody spectral distribution.

The method then determines a color correction based on the ambient and the target lighting conditions (step 10). The color correction optionally includes an estimated tint correction based on the lighting conditions (step 112). The method applies the color correction to correct the image to give it an appearance of having a target ambient lighting and optionally of having a target tint (step 114). The target ambient lighting can be user selected or it can be a default, e.g., a default daylight ambient lighting color temperature. In one implementation, the default color temperature as well as the tint can be further adjusted by a user to accommodate user preferences.

The net result is that an image containing skin is color corrected so that the skin color in the image is valid for a selected ambient lighting. The skin type controls enable variation of the skin tan and blush to reflect variations such as pale skin or light blushed skin or deeply tanned skin in the original image to produce a better corrected image. In addition, controls are provided to enable a user to specify a white constraint to keep white pixels white as the other image colors are changed.

Figure 2:
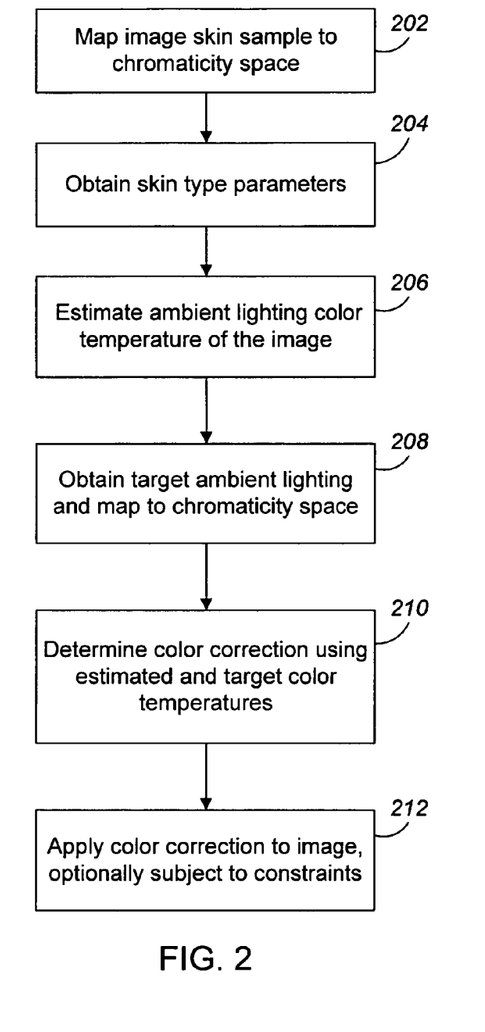
FIG. 2 is a flowchart of aspects of an implementation of the method of FIG. 1.

One implementation of a process of color correction will now be described in reference to FIG. 2.

The color value of the sample skin color from an image is mapped to a chromaticity space (step 202), as will be described below. A chromaticity space is a two-dimensional color space with no luminosity or intensity dimension. Suitable chromaticity spaces include the x, y space defined by the Commission Internationale de l'Éclairage (CIE). As an alternative to reducing multiple color values from the image to a single sample value in the image color space, multiple skin color values from the image can be mapped to the chromaticity space and a single value can be developed in the chromaticity space by calculating a mean, median, or other single value.

Optionally, skin type parameters specifying a specific coloration of human skin are set based on user input (step 204). In one implementation, parameters in the range of zero to one, inclusive, indicating degrees of tanning and blood flow, are used to model coloration of human skin.

The ambient lighting color temperature of the image is estimated from the mapped sample (step 206).

Estimation of the ambient lighting is based on a model for human skin coloration. The model defines a color appearance of human skin as a function of: (i) a base coloration of the skin and (ii) the perceived color temperature of the light illuminating the human skin (i.e., the dominant wavelength of the light spectrum). Base coloration is the color of skin when illuminated by a neutral gray light source. In the model presented below, base coloration will be broken down into a base coloration component that arises predominantly from melanin in the epidermis and a base coloration component which arises predominantly from hemoglobin in the dermis. These are represented by terms $c_m$ and $c_h$ in equation (Eq. 1), below.

Given an image showing a color appearance of human skin and using either default values or user input values (i.e., values obtained in step 204) for the base coloration of human skin in the image, one can estimate the color temperature of the light illuminating the human skin A suitable model for human skin coloration is described below.

Using default values as described above assumes that the base coloration of skin varies minimally across the human population. This assumption is reasonable because in chromaticity space, where luminosity is factored out, the base coloration of human skin falls within a fairly narrow range.

A target ambient lighting color temperature is obtained and mapped to the chromaticity space (step 208). The target color temperature, by default, is that of ambient outdoor lighting at noon, a color temperature of 5500 kelvin. Alternatively, the target lighting color temperature can be obtained from a user input.

A color correction is determined using the estimated and target lighting color temperatures (step 210). The color correction is calculated so that objects depicted in the image, including human skin, appear to be illuminated by the target ambient lighting instead of the estimated ambient lighting. In chromaticity space, the differences can be expressed in terms of a color temperature shift and a tint offset, as will be further described below.

The calculated color correction is applied to the image (step 212). The color correction is applied to pixels of the image. Optionally, constraints can be applied to the correction. One constraint preserves white pixels and limits the coloration of near-white pixels. The white constraint can be implemented as will be described below.

The calculation of an estimate of ambient lighting color temperature of the image will now be described. The description will begin with a description of one model of skin coloration, and then proceed to a description of how this model is used to estimate the ambient lighting color temperature and the tint offset.

In one implementation, skin coloration is modeled by approximating the skin as a two-layer medium. The outer layer, the epidermis, usually includes melanin. The underlying dermal layer includes blood vessels and the hemoglobin carried in the vessels. The two layers exhibit base colorations that vary according to the amount of melanin and hemoglobin present. The color appearance $C_{skin}$ of the skin layers is modeled as a function of the base colorations of the layers and the light illuminating the layers:

$$C_{skin} = (c_m)^\mu \cdot (c_h)^\nu \cdot C_{white},$$ (Eq. 1)

where the terms μ and ν represent the melanin and hemoglobin optical depths, respectively, and $c_m$ and $c_h$ are base colorations imparted by melanin and hemoglobin, respectively. $C_{white}$ is the observed color in the image of a white element in the scene. The colors in this model are in an RGB (red green blue) color space, and all operations are performed on each color individually. Note that the preceding equation (Eq. 1) is obtained from an empirical fit to image data. Thus, one can work in different RGB color spaces, in which the values for $c_m$, $c_h$, μ, and ν may differ but yield essentially equally good results.

The white color element can be parameterized by a color temperature T of the ambient lighting illuminating the human skin of interest. This is reasonable as long as the ambient lighting, in particular the dominant light that illuminates the skin, can be modeled by a blackbody spectrum of that color temperature. Equation (Eq. 1) then becomes:

$$C_{skin}(T) = (c_m)^\mu \cdot (c_h)^\nu \cdot C_{white}(T) \quad (Eq.\ 2)$$

where T is the blackbody color temperature.

Suitable values for $c_m$ and $c_h$ in RGB triples (r, g, b) and suitable values for the ranges of μ and ν are as follows:

$$c_m = (255, 231.8, 190.8)$$

$$c_h = (255, 231.2, 241.3)$$

$$0.50 < \mu < 1 + 0.50$$

$$0.95 < \nu < 1 + 0.95$$

Note that μ and ν can be expressed in terms of a tan and a blush value, each having a range from zero to one, or zero percent to 100 percent. Controls for tan and blush can thus be used to adjust μ and ν, as described with reference to FIG. 3. Using the foregoing values, the default values for 1 would be 1.0 and for ν the default value would be 1.45, to place the defaults at the midpoint of the range of possible values for each parameter.

Because skin colors encompass a wide range of intensities, it is advantageous to work in a color space in which intensity has been factored out. Such a color space is the CIE x, y color space, a chromaticity space that is derived from the CIE XYZ color space as follows:

$$x = X/(X+Y+Z)$$

and $$y = Y/(X+Y+Z)$$

X, Y, Z can be derived from RGB coordinates (r, g, b) as follows:

$$X = 0.4900 \cdot r1 + 0.3100 \cdot g1 + 0.2000 \cdot b1,$$

$$Y = 0.1770 \cdot r1 + 0.8123 \cdot g1 + 0.0107 \cdot b1,$$

and $$Z = 0.0100 \cdot g1 + 0.9900 \cdot b1,$$

where $$r1 = (r/255)^{2.4},$$

$$g1 = (g/255)^{2.4},$$

and $$b1 = (b/255)^{2.4}.$$

An implied white color is calculated using equation (Eq. 2) for a given nominal setting of μ and ν, as follows:

$$C_{white}(\mu,\nu) = (c_m)^{-\mu} \cdot (c_h)^{-\nu} \cdot C_{skin} \quad (Eq.\ 3)$$

The ambient color temperature, T, is calculated so that the resultant white color is as close as possible to the expected white at that color temperature. Any remaining difference determines a tint correction for the image.

The calculation of T can be performed using the following approximation (Eq. 4) of the white color corresponding a blackbody color temperature T, which is also referred to as the correlated color temperature. Other approximations can also be used.

$$C_{bbwhite}(T) = (x_{bbWhite}(T), y_{bbWhite}(T)), \quad (Eq.\ 4)$$

where $$x_{bbWhite}(T) = x = \exp(-1.3857 + 1.007 \cdot \exp(-0.277 \cdot pow(\log(T) - 6.57, 2.12)))$$

and $$y_{bbWhite}(T) = -2.72574163065810 \cdot (x \cdot x) + 2.70382143027623 \cdot x - 0.25631356869571$$

In these equations, the notation "exp(a)" denotes $e^a$; the notation "pow (a, b)" denotes $a^b$; and the notation "log( )" represents $\log_{10}(\ )$.

T is selected so that $C_{bbwhite}$ approximately equals the calculated value of $C_{white}(\mu, \nu)$. That is, equation (Eq. 3) is converted to the x, y color space and a temperature T is found for equation (Eq. 4) so that the resultant color is as close as possible to $C_{bbwhite}(T)$, that is, a value T is found so that:

$$C_{white}(\mu,\nu) \approx C_{bbwhite}(T) \quad (Eq.\ 5)$$

T can be found by any convenient numerical approximation method. For example, a sufficient and simple method is to try out all values from a set of possible values of T and to take the value which gives the best result for equation (Eq. 5). For example, let T=100, 200, 300, ..., 19900, 20000 and evaluate $$|C_{white}(\mu,\nu) - C_{bbwhite}(T)|$$

for each temperature value and choose a temperature which minimizes this value.

It will be recognized that $C_{bbWhite}(T)$ is a point on the blackbody curve (Planckian locus) in x, y space, and that $C_{white}(\mu,\nu)$ is a point on an isothermal line through $C_{bbWhite}(T)$ in a u, v diagram.

There will generally be some color difference between the two colors $C_{white}(\mu, \nu)$ and $C_{bbwhite}(T)$. Optionally, a tint offset, denoted t, can be calculated as the component of that difference projected along a perpendicular to the blackbody curve in the u, v chromaticity diagram.

The estimated ambient lighting color temperature T and the tint offset t having been determined, the colors of the image are corrected. The aim of the correction is to produce an image that appears as if illuminated by ambient lighting having a color temperature T0 and a desired tint t0=0. A non-zero desired tint can be optionally selected, e.g., as a user option. Each color in the image is processed as will be described. In one implementation, the pixels of the image are processed one at a time as follows.

Let (X, Y, Z) denote the original color of the pixel in the CIE XYZ color space. If the color is in another color space, the color is converted to (X, Y, Z) coordinates. This color is then converted to a color characteristic of color temperature T0 through a color temperature transformation:

$$(X1, Y1, Z1) = \text{colorTransform}(T, T0, X, Y, Z) \quad (Eq.\ 6)$$

A suitable transform is the well-known Bradford chromatic adaptation transform, which is described in Metamerism and Colour Constancy, K. M. Lam, Ph.D. Thesis, University of Bradford, 1985.

The foregoing calculations are based on a simplifying assumption that the camera, for example, is set assuming that the ambient lighting is equivalent to T0. In a situation in which this is not the case and the camera settings are known, they can be undone before equation (Eq. 6) is applied, to get a more accurate result.

This will now be described.

Let the true scene ambient color temperature be designated as Ts. And let the assumed color temperature (the white point setting) of the camera be Tc. Furthermore, let Cc designate the image colors as output by the camera and let Cs designate the scene colors (the colors before the camera applies its color conversion operations). The scene colors can be thought of as the colors as they would appear under a standard daylight illumination (with color temperature Td=5500 kelvin) modified by a color temperature conversion from Td to Ts:

$$Cs = Cd \cdot B(Td, Ts). \quad (Eq.\ 7)$$

The notation B(T1, T2) represents the color conversion of equation (Eq. 6). Such color temperature transformations have the following multiplicative property:

$$B(T1, T2) \cdot B(T2, T3) = B(T1, T3). $$

The camera color temperature conversion can be written in this notation as $$Cc = Cs \cdot B(Tc, Td), \quad (Eq.\ 8)$$

because it converts the image from an assumed temperature of Tc to the daylight temperature Td. Combining equations (Eq. 7) and (Eq. 8) using the multiplicative property of the transformations, one obtains the camera image colors in terms of the colors as they should appear under standard daylight lighting:

$$Cc = Cd \cdot B(Tc, Ts). \quad (Eq.\ 9)$$

Using the transpose property of the color transformation, $$B(T1, T2) = 1/B(T2, T1),$$

equation (Eq. 9) can be inverted to obtain the image colors under standard daylight conditions in terms of the camera output image colors:

$$Cd = B(Ts, Tc) \cdot Cc. \quad (Eq.\ 10)$$

This equation (Eq. 10) can be used as an alternative to equation (Eq. 5) in a process to determine the estimated scene temperature given a skin tone sample from the camera image. That is, equation (Eq. 2), with T=Td, produces an estimated skin color at the daylight temperature Td. Designating this as Cskin-d and the camera image skin sample as Cskin-c, equation (Eq. 10) specialized to the skin sample becomes $$Cskin\text{-}d = B(Ts, Tc) \cdot Cskin\text{-}c. \quad (Eq.\ 11)$$

If the camera white point setting is known (as it would be from a raw image format data file from a digital camera or other source), Tc is known. The preceding equation (Eq. 11) can then be solved to find the scene temperature, Ts, which best satisfies the equation. When multiple skin samples are used, Ts can be found by minimizing a mean squared error, averaged over all the skin samples.

On the other hand, if the camera white point setting is not known, the process may make a guess of its value. A simple assumption is Tc=Td; that is, the camera is using a standard daylight color temperature for its white point setting. In this situation, equation (Eq. 11) becomes $$Cskin\text{-}d = B(Ts, Td) \cdot Cskin\text{-}c. \quad (Eq.\ 12)$$

This is now the equation the process solves in order to obtain the estimated scene temperature, Ts. This is equivalent to the solution obtained using equation (Eq. 5). If the process had a better guess for the camera white point setting, then that guess for Tc could be used in equation (Eq. 11).

To summarize, if the process knows the camera white point setting, then this information can be used to obtain the estimated scene color temperature. On the other hand, if the camera white point setting is unknown (as is the case for a JPEG image file which lacks this camera metadata, for example) then the process may guess its value and a particularly reasonable guess is to take a standard daylight value for the color temperature. Either way, the process can obtain an estimate of the scene color temperature from the specified skin samples obtained from a camera image.

The next step is to transform the whole image or a portion of the image so that it depicts an image at the desired color temperature, T0. This can be accomplished by applying the color temperature transformation from Td to T0 to equation (Eq. 10):

$$C0 = B(Ts, Tc) \cdot Cc \cdot B(Td, T0). \quad (Eq.\ 13)$$

In the situation in which the camera color temperature is known to be or is assumed to be the daylight temperature, Td, then this simplifies (using the multiplication property of the transformations) to $$C0 = B(Ts, T0) \cdot Cc. \quad (Eq.\ 14)$$

This is equivalent to equation (Eq. 6) above, with T=Ts, the scene temperature as estimated from the skin tone samples.

On the other hand, if the camera color temperature is known to be or is guessed to be some other value, Tc, then the process uses equation (Eq. 13) to produce the color image, C0, which represents the scene at color temperature T0. For this situation, Ts is the estimated scene temperature obtained from the skin samples, Tc is the guessed or known camera color temperature setting, Td is the standard daylight temperature and T0 is the desired color temperature of the resultant image.

Yet an alternative approach is to let the desired color temperature be daylight: T0=Td. Then equation (Eq. 13) reduces to $$C0 = B(Ts, Tc) \cdot Cc. \quad (Eq.\ 15)$$

In this case the process can give the user control over the guessed value for the camera color temperature, Tc. This could be received by a numerical text input or by the user adjusting a slider, for example. The slider is controlling the guessed camera white point color temperature. In the alternative case specified in equation (Eq. 14) the slider would be controlling T0, the desired image color temperature. These are two equally valid approaches to giving the user control over the image coloration. They are alternative ways of adjusting the image color temperature.

There is yet another approach to that used above. The process could, in reference to equation (Eq. 11), assume that the scene temperature is known, for example, that it is the standard daylight temperature, Td: Ts=Td. Then the process can use equation (Eq. 11) to determine the camera color temperature setting, Tc, that gives a best match for the skin colors. This approach can be used to estimate the camera settings in situations for which it is unknown. Doing so makes the simplifying assumption that the image was actually taken at the daylight color temperature, but this is a reasonable assumption in many cases.

The next step is a shifting of the color to compensate for the tint offset. This is done in a u, v color space with the shift performed in a direction perpendicular to the blackbody spectral curve in this space. Calculating the perpendicular direction is described, for example, in Wyszecki & Stiles, COLOR SCIENCE (John Wiley & Sons, Inc., 2nd edition 1982), pp. 227-28.

That is, a color conversion $$(X1, Y1, Z1) \to (u1, v1)$$

is followed by a tint shift $$u1 \to u2 = u1 + du$$

$$v1 \to v2 = v1 + dv$$

where $$du = t \cdot nu$$

$$dv = t \cdot nv$$

and where (nu, nv) are the (u, v) components of the normals to the blackbody curve in the u, v space.

It was noted earlier that the foregoing calculations reflect a desired tint of zero, i.e., that t has been chosen so that $C_{white}$ matches $C_{bbwhite}$, but that non-zero tints could also be used. Thus, the tint value t can be increased or decreased beyond this chosen value to produce an additional color tint modulation of the image.

The (u2, v2) color is then converted back to the XYZ color space to produce (X2, Y2, Z2) in a conventional way:

$$(u2, v2) \to (X2, Y2, Z2)$$

with X2+Y2+Z2=X1+Y1+Z1.

Optionally, a white constraint can be enforced. In one implementation, a white constraint is enforced by blending the resultant color (X2, Y2, Z2) with the initial pixel color (X, Y, Z) to produce a final white-constrained color (X3, Y3, Z3), as follows:

$$X3 = f \cdot X + (1-f) \cdot X2$$

$$Y3 = f \cdot Y + (1-f) \cdot Y2$$

$$Z3 = f \cdot Z + (1-f) \cdot Z2$$

The blend parameter, f, can be controlled by a parameter whiteConstraint that varies between 0 and 1 inclusive and the delta of the original pixel color from white (1, 1, 1), as follows:

$$delta = [(X-1.0)^2 + (Y-1.0)^2 + (Z-1.0)^2]/3.0$$

$$k = 0.5/(whiteConstraint \cdot 10.0)^2$$

$$f = \exp(-k \cdot delta)$$

The parameter whiteConstraint can be specified by user selection through a user interface control.

In an alternative implementation, (X2, Y2, Z2) is blended with a pure white (1, 1, 1) instead of with the original color of the pixel and can produce white pixels that are whiter than those of the original image.

Figure 3:
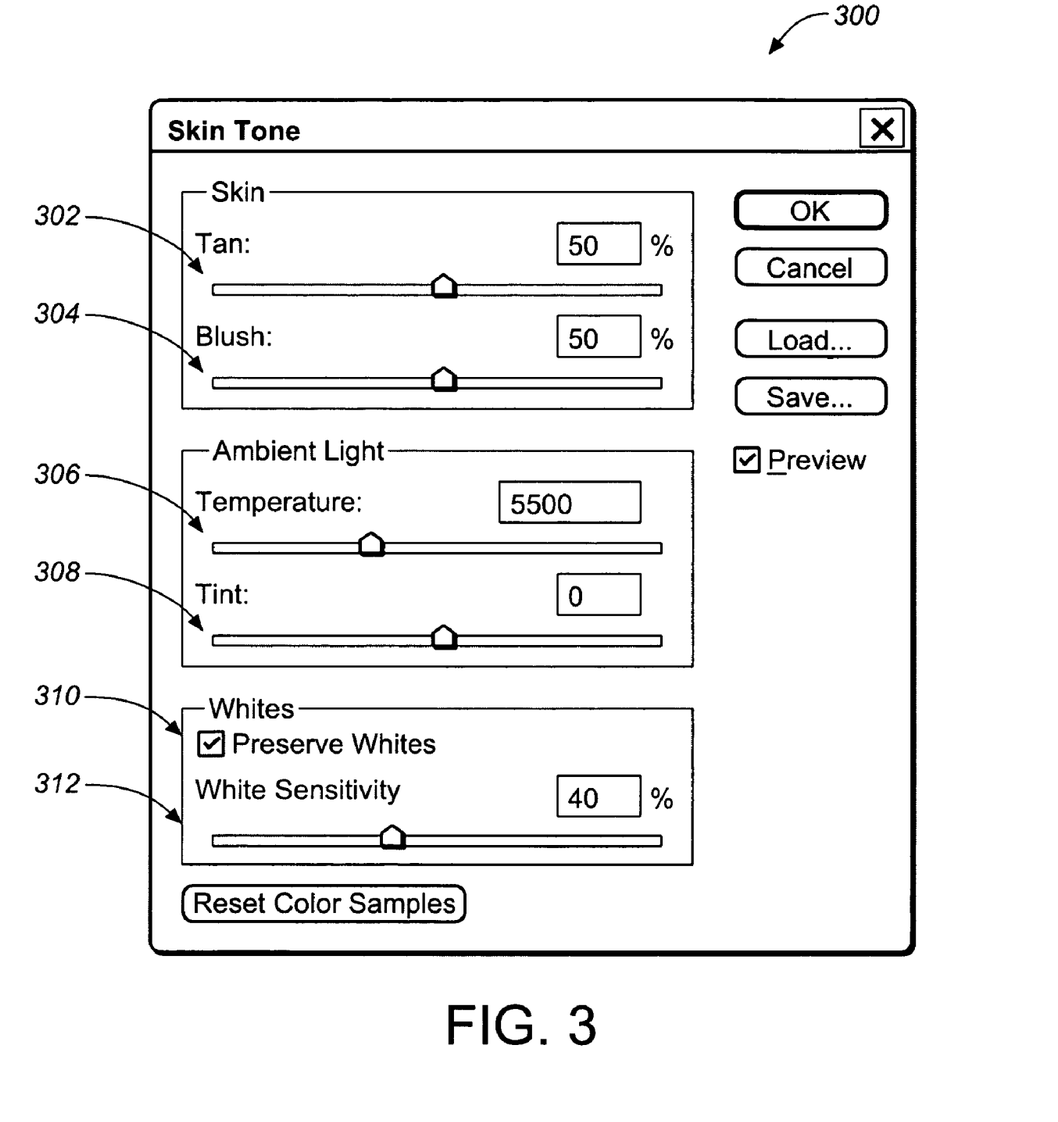
FIG. 3 shows an example of a user interface.

FIG. 3 shows a user interface 300 displayed by a computer program for receiving input for above-described color correction process. The user interface includes a slider 302 for selecting a tan value and a slider 304 for selecting a blush value. These sliders allow the user to control the assumed skin colorations parameters μ and ν, described above, by providing tan and blush values in the range of zero to one, inclusive.

The user interface 300 includes a slider 306 for selecting a target color temperature and a slider 308 for selecting tint.

The tint value, ranging from −100% to +100%, sets the value for the addition to the tint parameter t beyond what is needed to give a zero skin tone tint. It is a dimensionless number that provides a shift in u, v color space. The reasonable values for this number are of the order of the range of values in the this color space.

The sliders can be implemented to allow the user to select the target lighting condition and/or to adjust the estimated lighting condition.

Where the slider is implemented to set the final image color temperature, the program determines how to get the image to some standard daylight temperature and then the program brings the image from that temperature to the desired final color temperature. This is indicated in equations (Eq. 13) and (Eq. 14) above. For this case, the camera white point setting is either guessed to be Td, the standard daylight temperature, or it is determined by reading the camera white point settings directly (e.g., from a raw image format data file from a digital camera or other source).

Where the slider is implemented to set the guessed value of the camera white point color temperature setting, the desired final image color temperature is the standard daylight color temperature. Equation (Eq. 15) describes this situation.

The user interface 300 includes a check-box 310, the selection of which determines whether the above-described white constraint is applied. The user interface 300 includes a slider 312 for selecting white sensitivity, the whiteConstraint parameter mentioned above.

Optionally, if the user wishes to transform less than the entire image, the user can select only a portion of the image for color correction by using any interactive selection tool provided in connection with an implementation of the method. In an image processing application, for example, such tools can include a marquee, magic wand, or select by color range tool. Using such or other available tools, the user can make a mask around the portion to be corrected and then apply skin tone correction within the mask, with appropriate blending for feathered masks.

Embodiments of the invention and all of the functional operations described in this specification can be implemented in digital electronic circuitry, or in computer software, firmware, or hardware, including the structural means disclosed in this specification and structural equivalents thereof, or in combinations of them. Embodiments of the invention can be implemented as one or more computer program products, i.e., one or more computer programs tangibly embodied in an information carrier, e.g., in a machine-readable storage device, in a machine-readable storage medium, or in a propagated signal, for execution by, or to control the operation of, data processing apparatus, e.g., a programmable processor, a computer, or multiple processors or computers, which apparatus can include, in addition to hardware, general programming, e.g., processor firmware, a protocol stack, a database management system, or an operating system. A propagated signal is an artificially generated signal, e.g., an electrical, optical, or electromagnetic signal, that is made to communicate a computer program directly or indirectly to apparatus by which the program can be stored, executed, or both. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a digital camera, a digital scanner, a digital video recorder, a personal digital assistant (PDA), a mobile audio player, a Global Positioning System (GPS) receiver, to name just a few. Machine-readable storage devices or storage media suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the invention can be implemented on a computer or other device having a display device, e.g., a CRT (cathode ray tube) or LCD (liquid crystal display) monitor, for displaying information to the user, and any form of input device, e.g., keyboard and a pointing device, e.g., a mouse or a trackball, by use of which the user can provide input. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Particular embodiments of the invention have been described. Other embodiments are within the scope of the following claims. For example, the actions recited in the claims can be performed in a different order and still achieve desirable results. The native color space of an image need not be an RGB space. The above-described color correction can be applied to images that have other native color spaces. The above-described color correction need not be limited to the above-described skin coloration model and can be based on other skin coloration models. A suitable alternative skin coloration model is the Kubelka Munk model, described in Ein Beitrag zur Optik der Farbanstriche, P. Kubelka and F. Munk, Z. Tech. Phys., 11a (1931), pp. 593-601. The above-described user interface can include any mechanism for adjusting parameters and is not limited to sliders. A box for receiving numerical values, for example, can be implemented in the user interface. The user may select a skin tone sample by clicking on a single image pixel or an area containing multiple pixels. The user may click multiple times to select more samples. The user may brush over the image to select samples. Alternatively, the invention may be combined with an automatic face detection system which can automatically identify regions of skin tone in faces in the image. In this way, user interaction is not necessary, though it can still be used to supplement the automatic results.

What is claimed is:

1. A computer program product, tangibly stored on a non-transitory machine readable medium, the product comprising instructions operable to cause data processing apparatus to:
   receive a digital image that includes a region depicting human skin;
   obtain a skin color appearance value based on a sample of one or more pixels in the region, wherein a model has previously been created that relates the skin color appearance value to colorations imparted by melanin and hemoglobin;
   receive a base skin coloration value, the base skin coloration value being a tan parameter value or a blush parameter value;
   use the skin color appearance value and the base skin coloration value to determine an estimated perceived color temperature of light illumination in the image, wherein the estimated perceived color temperature is determined using a parametric formula that relates the model for the skin color appearance value, modified by the base skin coloration value, to the estimated perceived color temperature determine a color correction based on the estimated perceived color temperature and a target ambient lighting condition; and apply the color correction to the image.

2. The product of claim 1, wherein the instructions to determine the perceived color temperature comprise instructions to:
   calculate an estimated ambient lighting color temperature.

3. The product of claim 1, wherein the computer program product is embedded in an image capture device, the product comprising instructions operable to cause data processing apparatus to:
   detect a face in the image to identify the region depicting human skin.

4. The product of claim 1, further comprising instructions operable to cause data processing apparatus to:
   determine an estimated tint shift; and
   determine the color correction based on the estimated tint shift.

5. The product of claim 1, further comprising instructions operable to cause data processing apparatus to:
   provide a user interface operable to receive from a user an input specifying the base skin coloration value and an input specifying the target ambient lighting condition.

6. The product of claim 1, wherein:
   the target ambient lighting condition is a default daylight ambient lighting condition.

7. The product of claim 1, wherein:
   the color correction is applied to only a portion of the image.

8. The product of claim 1, further comprising instructions operable to cause data processing apparatus to:
   enforce a white constraint on the color correction.

9. The product of claim 8, wherein:
the white constraint is enforced by blending a calculated corrected color with an original color for a pixel according to a blend parameter derived from a delta of the original color from a white color.

10. The product of claim 1, wherein the instructions to receive a base skin coloration value comprise instructions to:
derive the base skin coloration value from user input.

11. A computer program product, tangibly stored on non-transitory machine readable medium, the product comprising instructions operable to cause data processing apparatus to:
receive a digital image that includes a region depicting human skin;
obtain a skin color appearance value based on a sample of one or more pixels in the region, wherein a model has previously been created that relates the skin color appearance value to colorations imparted by melanin and hemoglobin;
receive a base skin coloration value, the base skin coloration value being a tan parameter value or a blush parameter value;
use the skin color appearance value to calculate an estimated perceived color temperature of light illumination in the image and an estimated tint shift of the image, wherein the estimated perceived color temperature is determined using a parametric formula that relates the model for the skin color appearance value, modified by the base skin coloration value, to the estimated perceived color temperature;
calculate a color correction based on the estimated perceived color temperature and a target ambient lighting condition and the estimated tint shift; and
apply the color correction to the image.

12. The product of claim 11, further comprising instructions operable to cause data processing apparatus to:
provide a user interface operable to receive from a user an input specifying the target ambient lighting condition.

13. The product of claim 11, wherein:
the target ambient lighting condition is a default daylight ambient lighting condition.

14. The product of claim 11, further comprising instructions operable to cause data processing apparatus to:
enforce a white constraint on the color correction.

15. The product of claim 11, further comprising instructions operable to cause data processing apparatus to:
receive a user input specifying a desired non-zero tint shift; and
determine the color correction based further on the desired tint shift.

16. The product of claim 11, wherein the computer program product is embedded in an image capture device, the product comprising instructions operable to cause data processing apparatus to:
detect a face in the image to identify the region depicting human skin.

17. An apparatus, comprising:
means for obtaining a skin color appearance value based on a sample of one or more pixels in a region of a digital image, the region depicting human skin, wherein a model has previously been created that relates the skin color appearance value to colorations imparted by melanin and hemoglobin;
means for receiving a base skin coloration value, the base skin coloration value being a tan parameter value or a blush parameter value;
means for using the skin color appearance value and the base skin coloration value to determine an estimated perceived color temperature of light illumination in the image;
means for determining a color correction based on the estimated perceived color temperature and a target ambient lighting condition, wherein the estimated perceived color temperature is determined using a parametric formula that relates the model for the skin color appearance value, modified by the base skin coloration value, to the estimated perceived color temperature for an estimated ambient lighting color temperature; and
means for applying the color correction to the image.

18. The apparatus of claim 17, wherein the estimated ambient lighting condition is an estimated apparatus lighting color temperature.

19. The apparatus of claim 17, further comprising:
an image capture device for capturing the image; and
means for detecting a face in the image to identify the region depicting human skin.

20. The apparatus of claim 17, further comprising:
a user interface operable to receive from a user an input specifying the base skin coloration value and an input specifying the target ambient lighting condition.

21. The apparatus of claim 17, further comprising:
means for enforcing a white constraint on the color correction.

22. An apparatus comprising:
means for obtaining a skin color appearance value based on a sample of one or more pixels in a region of a digital image, the region depicting human skin, wherein a model has previously been created that relates the skin color appearance value to colorations imparted by melanin and hemoglobin;
means for obtaining a base skin coloration value, the base skin coloration value being a tan parameter value or a blush parameter value;
means for using the skin color appearance value to calculate an estimated perceived color temperature of light illumination in the image and an estimated tint shift of the image;
means for calculating a color correction based on the estimated perceived color temperature and a target ambient lighting condition and the estimated tint shift, wherein the estimated perceived color temperature is calculated using a parametric formula that relates the model for the skin color appearance value, modified by the base skin color value, to the estimated perceived color temperature; and
means for applying the color correction to the image.

23. The apparatus of claim 22, further comprising:
a user interface operable to receive from a user an input specifying the target ambient lighting condition.

24. The apparatus of claim 22, further comprising:
means for enforcing a white constraint on the color correction.

25. The apparatus of claim 22, further comprising:
an image capture device for capturing the image; and
means for detecting a face in the image to identify the region depicting human skin.

26. A computer program product, tangibly stored on non-transitory machine readable medium, the product comprising instructions operable to cause data processing apparatus to:
receive a digital image that includes a region depicting human skin;
obtain a skin color appearance value based on a sample of one or more pixels in the region, wherein a model has previously been created that relates the skin color appearance value to colorations imparted by melanin and hemoglobin;

receive a base skin coloration value, the base skin coloration value being a tan parameter value or a blush parameter value;

use the skin color appearance value and the base skin coloration value to determine an estimated camera color setting, wherein the estimated camera color setting is determined using a parametric formula that relates the model for the skin color appearance value, modified by the base skin coloration value, to the estimated camera color setting for an estimated perceived color temperature of light illumination in the image;

determine a color correction based on the estimated camera color setting and a target ambient lighting condition; and apply the color correction to the image.

27. The product of claim 26, wherein the estimated camera color setting is a camera white point setting.

* * * * *

UNITED STATES PATENT AND TRADEMARK OFFICE
CERTIFICATE OF CORRECTION

PATENT NO. : 8,103,094 B2  Page 1 of 1
APPLICATION NO. : 11/233535
DATED : January 24, 2012
INVENTOR(S) : Gregg D. Wilensky

It is certified that error appears in the above-identified patent and that said Letters Patent is hereby corrected as shown below:

Column 14, line 35, in Claim 1, delete "temperature determine" and insert
-- temperature; determine --, therefor.

Column 15, line 9-10, in Claim 11, delete "non-transitory" and insert -- a non-transitory --, therefor.

Column 16, line 61-62, in Claim 26, delete "non-transitory" and insert -- a non-transitory --, therefor.

Signed and Sealed this
Tenth Day of April, 2012

David J. Kappos
*Director of the United States Patent and Trademark Office*